United States Patent [19]
Shindou et al.

[11] Patent Number: 6,064,402
[45] Date of Patent: May 16, 2000

[54] CHARACTER DISPLAY CONTROL CIRCUIT

[75] Inventors: Hiroyasu Shindou; Riichi Furukawa, both of Ota, Japan

[73] Assignee: Sanyo Electric Co., Ltd., Osaka, Japan

[21] Appl. No.: 09/148,824

[22] Filed: Sep. 4, 1998

[30] Foreign Application Priority Data

Sep. 9, 1997 [JP] Japan ................................ 9-244489

[51] Int. Cl.[7] ................................................ G06T 17/00
[52] U.S. Cl. .......................................... 345/467; 345/468
[58] Field of Search .................................... 345/441, 467, 345/468, 469, 470, 471

[56] References Cited

U.S. PATENT DOCUMENTS

| | | | |
|---|---|---|---|
| 5,768,490 | 6/1998 | Hersch et al. | 345/468 |
| 5,831,636 | 11/1998 | Merchant et al. | 345/467 |
| 5,870,085 | 2/1999 | Laksono | 345/467 |
| 5,936,636 | 8/1999 | Gelfenbain | 345/467 |
| 5,940,084 | 8/1999 | Motokado et al. | 345/468 |
| 5,940,085 | 8/1999 | Chandavarker et al. | 345/467 |

*Primary Examiner*—Phu K. Nguyen
*Assistant Examiner*—Cliff N. Vo
*Attorney, Agent, or Firm*—Loeb & Loeb, LLP

[57] ABSTRACT

Data about display start positions are stored in an H register. An H start counter counts an original oscillation signal ORGCLK after the termination of a flyback period, and a comparator detects a start position. Flip flops and NOR gates form a clock having a cycle one and a half times as long as that of the original oscillation signal from the start position, and either the signal having a 1.5-fold cycle or the original oscillation signal is selected according to the level of a mode signal MODE. Thus, it is possible to obtain a clock OSD-CLK having a frequency the same as that of the original oscillation signal up to the start position and a clock OSD-CLK having a frequency corresponding to magnification from a display position. Therefore, by controlling display of characters based on the clock OSDCLK, display start positions can be made even regardless of magnification.

8 Claims, 4 Drawing Sheets

CHARACTER DISPLAY CONTROL CIRCUIT

BACKGROUND OF THE INVENTION

1. Field of the Invention

The present invention relates to a character display control circuit which controls display of characters on a screen.

2. Description of the Related Art

Heretofore, a television receiver and a video tape recorder (VTR) which have on-screen functions of displaying character data of every kind on a television screen according to instructions of viewers have been known. Such an on-screen function is generally achieved by a microcomputer having a video RAM (VRAM) and a character ROM. More specifically, a character code corresponding to a character to be displayed is stored in an address of the VRAM corresponding to the portion of a television screen on which the character is displayed. According to horizontal or vertical scanning of television signals, the character code is then read out of the VRAM. On the other hand, a dot pattern of character font for each of all the characters which can be displayed on the television screen is stored in the character ROM. Thus, the character is displayed on the television screen according to the character code read out of the VRAM and the dot pattern of character font read out of the character ROM.

Here, a device with such an on-screen function also has a function of changing the size of a character to be displayed. This size change is executed by changing the frequency of a display clock of the character and controlling a period of displaying one dot. For example, if the frequency is reduced to two thirds, the display period will become one and a half times, whereby the size of character in a horizontal direction can be one and a half times.

However, such a device has a disadvantage that the start position of a horizontal display position of the character gets out of position. In other words, the display start position is determined according to count of the display clock. When the frequency of the display clock is changed, even though the same counted value has been set, the display start point differs. Thus, the display start position gets out of position.

SUMMARY OF THE INVENTION

The object of the present invention is to provide a display control circuit of simple constitution which can control a horizontal display start position of a character.

In the present invention, a reference clock is counted up to the horizontal display start position of a character, and afterward a display clock is used. Thus, even though a magnification of the character to be displayed is changed by changing a frequency of the display clock, the display start position is not changed. Therefore, even though the magnification of the character to be displayed is changed, a clear display can be achieved without the display start position being out of position.

Further, preferably, the display position is determined according to a value counted from the termination of a flyback period, thereby enabling dependable control of the display position.

Further, the present invention preferably has a start counter for counting a reference clock after the termination of a flyback period of horizontal scanning and a comparator for comparing a counted value of the start counter with data about a character display start position, and the display start position is detected by the comparator. Due to such a constitution, the display start position can be detected by counting of the reference clock performed by the start counter. A signal representing a display start can also be obtained as an output of the comparator.

Further, the present invention has a clock generator for outputting clocks having different cycles and a selector for selecting either the clock outputted by the clock generator or the reference clock described above and outputting it as a display clock, and the clock to be selected by the selector is controlled. Thus, after starting display of characters, it is possible to switch the display from a reference clock as it is to a clock having a cycle which is one and a half times as long as that of the reference clock, and vice versa.

Further, independent of the display of characters described above, timing of displaying a cursor is controlled. The display of a cursor is generally the display of a font, and the horizontal display start position is determined beforehand. Then, the display position is previously read, for example, during a flyback period, and therefore the display start position can be detected based on a counted value of the start counter. Thus, it is possible to use a single counter which serves as these two counters.

DESCRIPTION OF THE PREFERRED EMBODIMENT

An embodiment of the present invention will subsequently be described with reference to the accompanying drawings.

Figure 1:
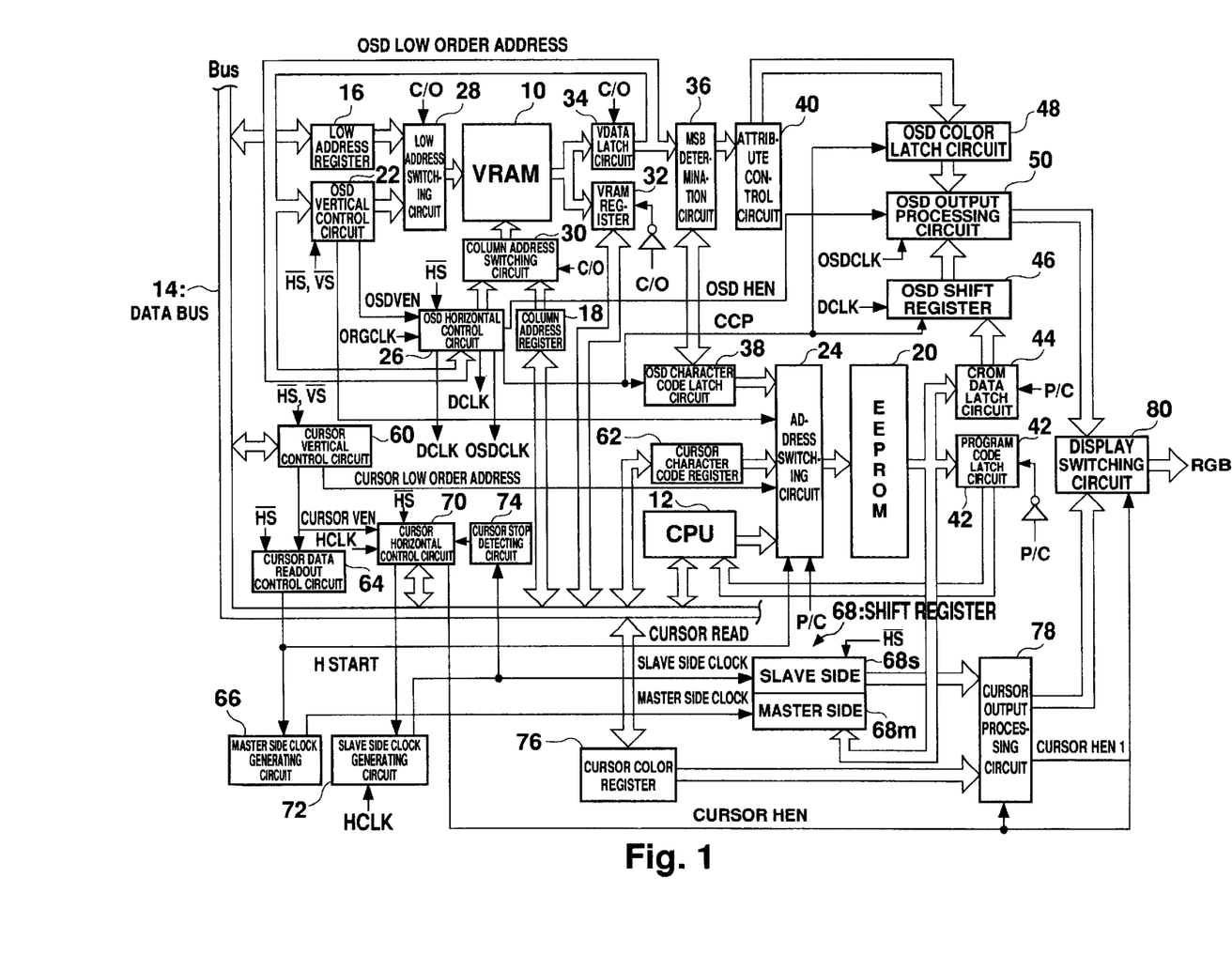
FIG. 1 is a block diagram showing overall constitution of the circuit according to an embodiment.

FIG. 1 is a block diagram showing the overall constitution of a display control circuit according to the present invention. This circuit is composed of a single microcomputer. A VRAM 10 stores a character code corresponding to a character to be displayed in an address corresponding to the display portion of a television screen. Further, when qualifying (attribute) data showing a color of the characters to be displayed are stored, as a substitute for the character code, an attribute code which designates the character code is stored. This attribute is supposed to maintain the same condition once it is designated. For such a reason, the attribute code is stored in the previous address of the address for a character whose attribute is desired to be changed. Thus, when characters are consecutively displayed with the same attribute on a television screen, it is sufficient as long as an attribute code is stored in the previous address to the one in which a character code for the first character is stored.

Further, each address of the VRAM 10 is composed of, for example, eight bits. The most significant bit (MSB) is an identification bit which identifies a character code or an attribute code, and the remaining seven bits show character codes or attribute codes. Further, an MSB "0" represents a character code and an MSB "1" an attribute code, respectively. By reading out and determining the MSB, it is possible to identify a character code or an attribute code. The remaining seven bits, namely, "00" to "7F"H (a symbol H indicates that the number is hexadecimal) and "80 to FF," designate 128 kinds of character codes and 128 kinds of attribute codes, respectively.

In the VRAM 10, a region for storing pallet data is provided. The pallet data region is a region for storing data to specify the attributes of characters (characters to be displayed), backgrounds, and edging. In other words, using attribute codes read out of the VRAM 10 as address data, the pallet region is accessed and the attribute of characters to be displayed is determined.

A CPU 12 performs arithmetic processing of eight bits, for example. The CPU 12 performs a logical operation according to results of decoding of the program data read out of an EEPROM 20. It also transfers address data, character codes, and attribute codes via a data bus 14 for the purposes of writing into the VRAM 10, and fetches codes of every kind via the data bus for the purpose of confirming the contents which are written into the VRAM 10.

Here, one machine cycle of the microcomputer is composed of CPU timing at which writing or reading operation of the VRAM 10 is performed based on the results of decoding of the program data and on-screen display (OSD) timing at which reading operation of the VRAM 10 is performed independent of operation of the CPU 12. Specifically, one machine cycle is composed of six states and repeats alternately the CPU timing and the OSD timing. The VRAM 10 is accessed independently at the CPU timing and the OSD timing and therefore a single port having simple composition will suffice.

During the CPU timing of each machine cycle, addressing is made to a low address of the VRAM 10 by a low address register 16. Low address data from the CPU 12 are sent to this low address register 16 via the data bus 14. Similarly, during the CPU timing of each machine cycle, addressing is made to a column address of the VRAM 10 by a column address register 18. Column address data from the CPU 12 are sent to the column address register 18 via the data bus 14.

The EEPROM 20 is composed of eight bits in order to adjust to 8-bit arithmetic processing to be performed by the CPU 12. In the EEPROM 20, addresses corresponding in number to 128 kinds of character fonts are allocated to a second storage region for storing character data. Further, the remaining addresses are allocated to a first storage region for storing the program data which are used to control operation of the microcomputer.

In particular, in the second storage region of the EEPROM 20, dot patterns (character patterns) of all the characters to be displayed on a television screen are previously stored. For example, if each character displayed on a television screen which is viewed by a user is formed by a specified character font (length m dot×breadth n dot), a dot pattern corresponding to the character font is stored in each address of the second storage region. Also, a character font will be specified by a character code read out of the VRAM 10. Thus, a low address in a character font will be specified by single horizontal scanning, and data will be read out of the low address. Further, the next low address will be specified by the next horizontal scanning, and data (n dot data per character) in the low address will be read out. By repeating this operation m times in a vertical direction, dot data for one character will be read out. In ordinary cases, a plurality of characters are displayed horizontally. Therefore, low addresses in a plurality of character fonts are specified by single horizontal scanning, and a plurality of dot data are read out one by one.

An OSD vertical control circuit 22 detects a vertical start position of a character to be displayed, and during the OSD timing of each machine cycle, it controls vertical addressing of the VRAM 10. Further, the OSD vertical control circuit 22 has a first counter for counting rises of horizontal synchronizing signals Hsync in a binary scale after being reset by a rise of vertical synchronizing signal Vsync which is contained in a television signal. The OSD vertical control circuit 22 also has a first register in which the number of horizontal synchronizing signals Hsync at the time of completing horizontal scanning up to a vertical start position of characters to be displayed is previously set in a binary scale by the CPU 12. Further, the OSD vertical control circuit 22 generates low address data which are incremented whenever rises of horizontal synchronizing signals Hsync are applied m times from a point in time when the first counter counted up to the value of the first register.

Every time the low address data are incremented, the OSD vertical control circuit 22 supplies a value obtained by counting rises of m horizontal synchronizing signals Hsync in a binary scale to an address switching circuit 24, which will be described later, for the purpose of controlling addresses in the second storage region of the EEPROM 20. Thus, the second storage region of the EEPROM 20 is accessed by character codes of the VRAM 10 and low addresses of character fonts specified by horizontal scanning, and breadth n dot data about each character to be displayed are read out m times in a vertical direction.

In order to operate a circuit shown in FIG. 1, many kinds of clock are required, other than synchronizing signals contained in television signals. Therefore, a clock generating circuit (not shown in the drawings) is provided. More specifically, this clock generating circuit generates dot clocks DCLK which repeat cycles at each horizontal dot of character data in response to oscillation clocks LC. The clock generating circuit also generates character switching pulses CCP at each breadth n dot of character data in response to dot clocks DCLK. Further, the clock generating circuit is also connected with the CPU 12 via the data bus 14, and therefore it also performs switching of a text mode and a caption mode according to an instruction from the CPU 12.

An OSD horizontal control circuit 26 detects a horizontal start position of characters to be displayed. It also controls addressing of the VRAM 10 during the OSD timing of each machine cycle. The OSD horizontal control circuit 26 contains a second counter which is reset by a rise of a horizontal synchronizing signal Hsync contained in a television signal and counts rises of dot clocks DCLK in a binary scale. The OSD horizontal control circuit 26 also contains a second register in which the number of dot clocks DCLK counted up to a horizontal start position of characters to be displayed is previously set in a binary scale. Further, the OSD horizontal control circuit 26 generates column address data which are incremented whenever dot clocks DCLK are applied n times from a point in time when the second counter counted up to the value of the second register.

A low address switching circuit 28 outputs a low address of either the low address register 16 or the OSD vertical control circuit 22 in response to a timing switching signal C/O. Here, the timing switching signal C/O becomes high level in the CPU timing and low level in the OSD timing. In other words, the low address switching circuit 28 applies data held by the low address register 16 to the VRAM 10 when the timing switching signal C/O is high level, and applies data held by the OSD vertical control circuit 22 to the VRAM 10 when the timing switching signal C/O is low level.

Further, column address switching circuit 30 applies data held by the column address register 18 to the VRAM 10 when the timing switching signal C/O is high level, and applies data held by the OSD horizontal control circuit 26 to the VRAM 10 when the timing signal C/O is low level.

Thus, the VRAM 10 is accessed by the data from the low address register 16 and the column address register 18 during the CPU timing, and is accessed by the data from the OSD vertical control circuit 22 and the OSD horizontal control circuit 26 during the OSD timing.

A VRAM register 32 is connected with the data bus 14 and the VRAM 10. During the CPU timing in which the timing switching signal C/O is high level, writing and reading of character codes and attribute codes into or from the VRAM 10 are performed through the VRAM register 32. For example, if writing into the VRAM 10 is performed, during a period which is the sixth state of each machine cycle and the timing switching signal C/O is high level, character codes or attribute codes will be written into an accessed address of the VRAM by the CPU 12 via the data bus 14 and the VRAM register 32. Further, if reading out of the VRAM 10 is performed for the purpose of confirming the contents written into the VRAM 10, during a period of the timing switching signal C/O is high level which is the fourth state of each machine cycle, the CPU 12 will fetch character codes or attribute codes from the accessed address of the VRAM 10 via the VRAM register 32 and the data bus 14. Thus, decoding of codes or the like will be carried out in the CPU 12.

On the other hand, during the OSD timing in which the timing switching signal C/O is low level, if the VRAM 10 is in a feasible condition of readout and its address corresponding to both data of the OSD vertical control circuit 22 and the OSD horizontal control circuit 26 is accessed, character data or attribute codes will be read out from the relevant address of the VRAM 10 and latched to a VDATA latch circuit 34. The data latched to the VDATA latch circuit 34 are outputted to an MSB determination circuit 36 at the timing the timing switching signal C/O is switched from low to high level.

The MSB determination circuit 36 determines whether the data read out of the VRAM 10 via the VDATA latch circuit 34 are character codes or attribute codes. More specifically, as described above, a classification of the codes can be determined by confirming whether the MSB of the data read out is "0" or "1," whereby the MSB determination circuit 36 makes the determination.

If it is determined by the MSB determination circuit 36 that the data are character codes (MSB=0), the character codes are supplied to an OSD character code latch circuit 38. The OSD character code latch circuit 38 latches the character codes outputted from the MSB determination circuit 36 synchronizing with a rise of a character switching pulse CCP. Synchronizing with a timing switching signal P/C, the address switching circuit 24 outputs either the address data to access the first storage region of the EEPROM 20 or the address data to access the second storage region of the EEPROM 20, both of which are outputted from a program counter (not shown in the drawings) in the CPU. Here, the address data to be accessed to the second storage region are composed of the character codes latched to the OSD character code latch circuit 38 and vertical address data of the character font specified by horizontal scanning.

Here, the timing switching signal P/C is the one which becomes high level only in the first and fourth states of each machine cycle, and these high level periods are those which allow the address data from the CPU 12 to pass. Further, the remaining periods of being low level are those which permit the passing of address data composed of the character codes latched to the OSD character latch circuit 38 and the vertical address data of character font specified by horizontal scanning.

When the attribute codes (MSB=1) are identified by the MSB determination circuit 36, the attribute codes are supplied to an attribute control circuit 40. At the timing of a transition of the timing switching signal C/O from low to high level, the attribute control circuit 40 generates attribute control data to apply character qualification to each character to be displayed based on the attribute codes outputted from the MSB determination circuit 36. The attribute control data are generated by reading out the relevant address in the pallet region of the VRAM 10.

A program code latch circuit 42 temporarily stores program data outputted from the EEPROM 20 and supplies them to the CPU 12. During a period when the timing switching signal P/C is at a high level (the first state of each machine cycle), the program data stored in the first storage region of the EEPROM 20 are fetched to the CPU 12 via a program code latch circuit 42, and the CPU 12 carries out instructions for arithmetic processing of the data. Further, during a period when the timing switching signal P/C is at a low level, character font data stored in the second storage region of the EEPROM 20, namely, bit data to the amount of n bits specified by horizontal scanning (for example, a bit pattern in which numeral 1 represents "display" and numeral 0 represents "non-display") are outputted and latched to a CROM data latch circuit 44. It is also preferable to allocate two bits of data to each dot and to perform four kinds of display. In this case, it is sufficient if two bits data are read out for the address to display one dot described above. Also, four kinds of values "00," "01," "10," and "11" can be represented by two bits of data. Thus, it is possible to provide four kinds of states of display for each dot. Each of four kinds of attribute control data stored in four registers corresponds to the four kinds of values described above. Thus, based on the two bits of data used for the display of one dot, any one of the four kinds of attribute control data is designated, and a color specified by each of the attribute control data is displayed. Further, by changing the attribute control data to be stored in the registers, the color to be displayed can be changed.

The CROM data latch circuit 44 is the n bit latch circuit described above. This circuit latches by n bits the data of one character font specified by single horizontal scanning which are outputted from the EEPROM 20 during a period of the timing switching signal P/C being low level. Synchronizing with the character switching pulse CCP, the n bit data latched to the CROM data latch circuit 44 are set to an OSD shift register 46, and then the OSD shift register 46 repeats serial outputting of the n bit data synchronizing with dot clocks DCLK. Further, attribute control data outputted from the attribute control circuit 40 are set to an OSD color latch circuit 48 synchronizing with the character switching pulse CCP.

An OSD output processing circuit 50 carries out signal processing of both n bit character data outputted from the OSD shift register 46 and attribute control data outputted from the OSD color latch circuit 48, and outputs RGB signals. [Control of character display start horizontal position]

Figure 2:
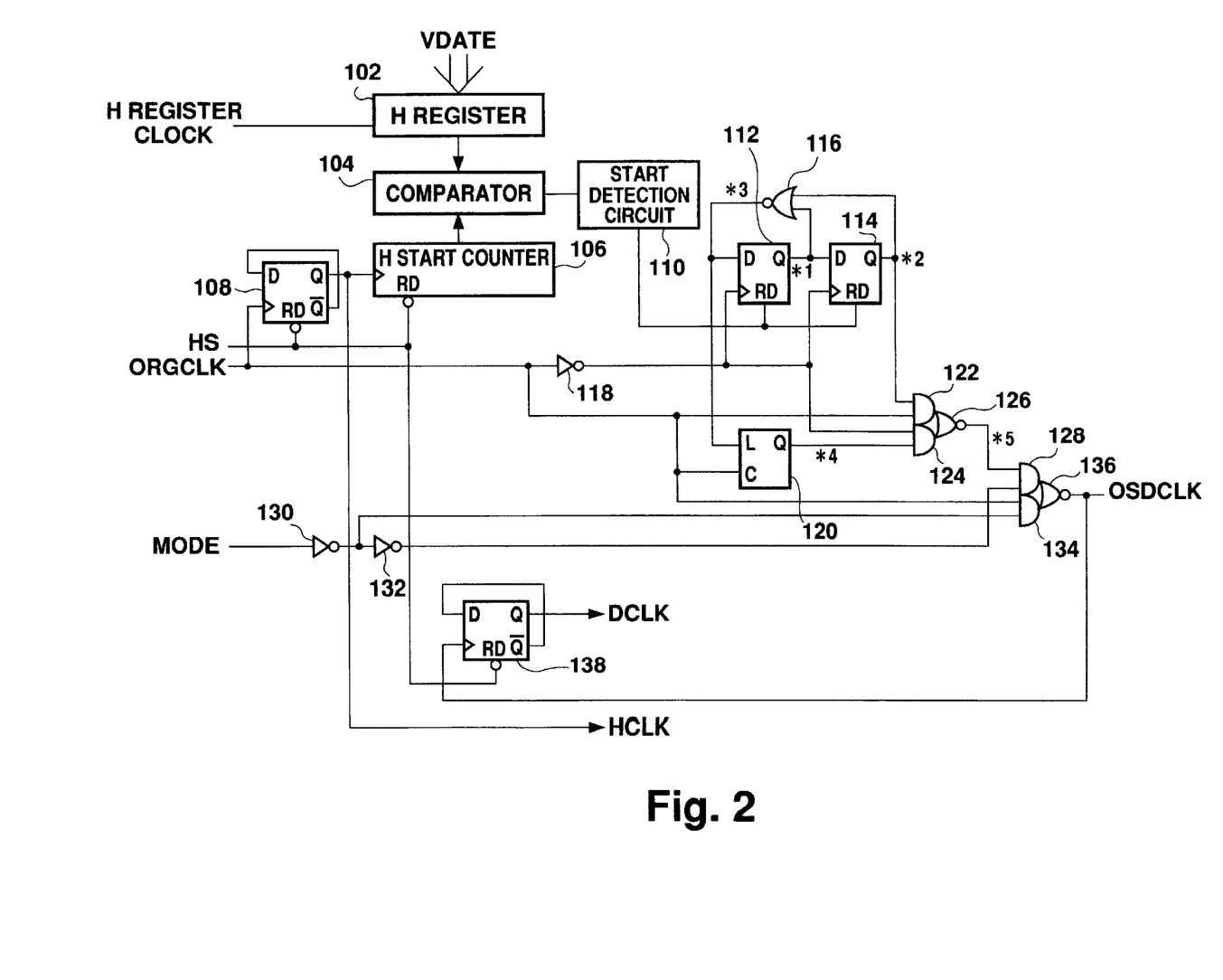
FIG. 2 shows a circuit for generating clocks OSDCLK.

FIG. 2 shows a circuit which generates a clock OSDCLK from an original oscillation clock ORGCLK as a clock DCLK for controlling a period of displaying one dot in the character display in the OSD horizontal control circuit 26. The clock DCLK is used as a shift clock of the OSD shift register 46. The clock OSDCLK is supplied to the OSD output processing circuit 50 and used for waveform shaping of the RGB signals outputted. The original oscillation clock ORGCLK stops oscillation during a period when inverted horizontal synchronizing signals $\overline{\text{HS}}$ are at low level, and starts oscillation when the inverted horizontal synchronizing signals $\overline{\text{HS}}$ become high level after the termination of a flyback period.

The VDATA latched in the VDATA latch circuit 34 are supplied to an H register 102. H register clocks are supplied to the H register 102 as clocks for latching. The H register clocks are generated at appropriate CPU timing during a flyback period of the horizontal synchronizing signals. Therefore, the H register 102 fetches the VDATA (a value of the number of dot clocks) about a horizontal display start position of display characters read out of a prescribed region of the VRAM 10 at the CPU timing. Thus, by the time the horizontal flyback period is completed, data about the horizontal character display position would have been stored.

Outputs of the H register 102 are supplied to a comparator 104. Data from an H start counter 106 are also supplied to the comparator 104. Thus, the comparator 104 compares the outputs and the data. Here, the H start counter 106 detects a display position in horizontal scanning. An inverted horizontal synchronizing signal is supplied to a reset terminal of the H start counter 106. Also, an original oscillation clock ORGCLK is divided in half by a flip flop 108 and inputted to the H start counter 106 as a clock whose frequency becomes half. Thus, when the horizontal flyback period elapses, the H start counter 106 counts up the H count clock whose frequency is half as much as that of the original oscillation clock ORGCLK. In order to have consistency among counted values in the comparator 104, it is possible to eliminate the flip flop 108 and have the H start counter 106 count the original oscillation clock ORGCLK directly.

As described above, the comparator 104 compares a value of the display start position supplied from the H register 102 with a value of the number of clocks counted after the termination of the flyback period supplied from the H start counter 106. When both values coincide (when it reaches the display start position), the comparator 104 outputs a signal representing the coincidence. This coincidence signal is supplied to a start detection circuit 110.

The start detection circuit 110 is, for example, composed of a delay circuit, and outputs a signal which becomes high level after a prescribed delay compared with an output of the comparator. Outputs of the start detection circuit 110 are supplied to the inversion reset terminals of two D flip flops 112 and 114. Original oscillation clocks ORGCLK are supplied to the clock terminals of these two flip flops 112 and 114. A Q output of the flip flop 112 is supplied to the D input terminal of the flip flop 114. A Q output of the flip flop 114 is supplied to the D input terminal of the flip flop 112 via a NOR gate 116. Further, the Q output of the flip flop 112 is supplied to the other input terminal of the NOR gate 116. Thus, these two flip flops 112 and 114 function as ternary counters which start operation from the rise of an output signal transmitted from the start detection circuit 110.

On the other hand, an original oscillation clock ORGCLK is inputted to the clock terminal of a transparent flip flop 120 after having been inverted by an inverter 118. An output of the NOR gate 116 is supplied to the L input terminal of the transparent flip flop 120. Here, when a clock to be inputted to the clock terminal is high level, the transparent flip flop 120 outputs to the Q output terminal an input from the L input terminal as it is. When the clock is low level, the transparent flip flop 120 holds data.

A Q output of the flip flop 114 and an inverted original oscillation clock $\overline{\text{ORGCLK}}$ from the inverter 118 are inputted to an AND gate 122. An original oscillation clock ORGCLK and a Q output of the transparent flip flop 120 are inputted to an AND gate 124. Further, outputs of the AND gates 122 and 124 are inputted to a NOR gate 126. Thus, the NOR gate 126 outputs inverted original oscillation clocks $\overline{\text{ORGCLK}}$ for a prescribed period after the completion of a horizontal flyback period, and outputs clocks which are the original oscillation clocks ORGCLK expanded to one and a half times after a termination of the prescribed period.

The outputs of the NOR gate 126 are inputted to an AND gate 128. A mode signal MODE is inverted once by an inverter 130 and then inverted again by an inverter 132, thereby restoring it to the original mode signal. The restored signal is supplied to the AND gate 128. Further, inverted clocks $\overline{\text{ORGCLK}}$ which are outputs of the inverter 118 are inputted to an AND gate 134. The mode signal inverted by the inverter 130 is inputted to the AND gate 134. Outputs of the AND gates 128 and 134 are inputted to a NOR gate 136. Thus, as outputs of the NOR gate 136, when the mode signal MODE is high level, the inverted output of the NOR gate 126 is obtained, whereas when the mode signal MODE is low level, a signal which is same as the original oscillation clock ORGCLK is obtained. If the mode signal is high level, a clock OSDCLK having a cycle which is equivalent to that of the original oscillation signal will be obtained, whereas if it is low level a clock OSDCLK having a cycle which is one and a half times as long as that of the original oscillation signal will be obtained. Further, even in the case that a clock OSDCLK having a cycle which is one and a half times as long as that of the original oscillation signal is outputted, during a prescribed period after the completion of a horizontal flyback period, a clock OSDCLK having a cycle equivalent to that of the original oscillation signal is outputted.

Further, an inverted horizontal synchronizing signal is inputted to an inversion reset terminal of a flip flop 138, and a clock OSDCLK which is an output of a NOR gate is inputted to the clock terminal of the flip flop 138. Further, an inverted Q output of the flip flop 138 is inputted to the D input terminal. Thus, as a Q output of the flip flop 138, it is possible to obtain a dot clock DCLK which is a clock OSDCLK divided in half and the cycle of which is twice as long as that of the clock OSDCLK.

Figure 3:
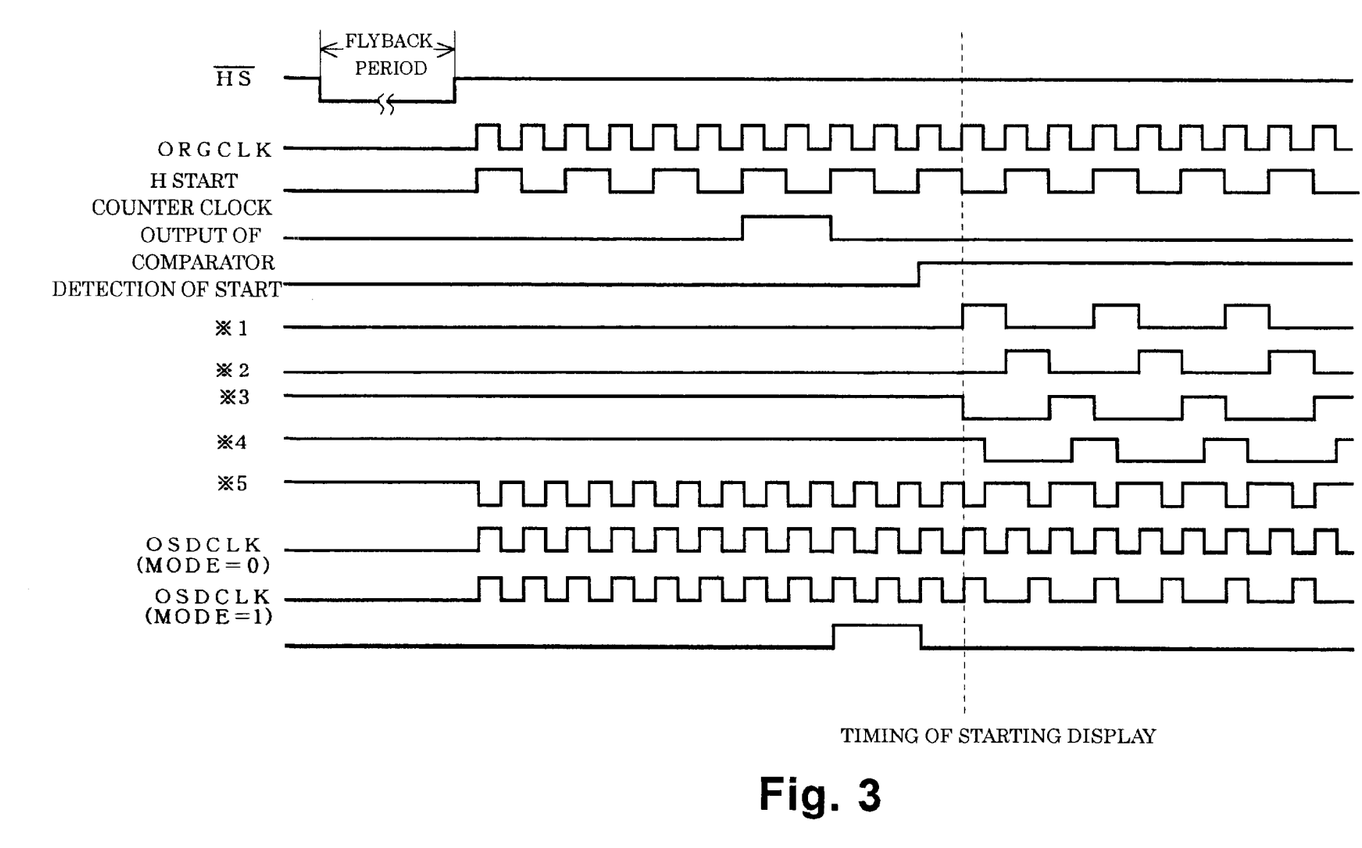
FIG. 3 is a timing chart showing generation of the clocks OSDCLK.

Here, generation of the clock OSDCLK will be described with reference to FIG. 3. The inverted horizontal synchronizing signal rises when the flyback period is terminated. The original oscillation signal ORGCLK stops oscillation during a period of the inverted horizontal signal $\overline{\text{HS}}$ being low level, and starts oscillation of the clock at a certain frequency when the flyback period elapses. The H start counter 106 counts an H start counter clock which is the original oscillation signal ORGCLK divided in half by the flip flop 108 and which has a frequency half that of the original oscillation signal ORGCLK. On the other hand, in the H register 102, a signal representing the display start horizontal position is stored during the flyback period. Therefore, if the value counted by the H start counter 106 coincides with a value of the display start horizontal position, a signal representing the coincidence will be outputted from the comparator 104. This coincidence signal becomes high level only during a period of one clock in the H start clock. When it reaches the last transition of the coincidence signal, the start detection circuit 110 outputs a signal which becomes high level after a delay of a period of the character switching pulse CCP to prescribe the width of character being high level. The output of the start detection circuit 110 becomes low level in the next flyback period. In this example, the high level period of the CCP is equivalent to one clock of an H start counter clock. Further, the CCP becomes high level again at the time when outputting for the character is completed (when outputting of n dots is completed).

As the output of the start detection circuit 110 is high level, the flip flops 112 and 114 operate and begin to count the original oscillation signals ORGCLK. In FIG. 3, a reference symbol *1 represents a Q output of the flip flop 112, *2 represents a Q output of flip flop 114, *3 represents an output of the NOR gate 116, *4 represents an output of the transparent flip flop 120, and *5 represents an output of the NOR gate 126, respectively. As described above, the flip flops 112 and 114 and the NOR gate 116 function as ternary counters, and as an output *5 of the NOR gate 126, a signal whose cycle is expanded to one and a half times as long as that of the original oscillation signal ORGCLK (it is expanded to two times only during a period of being high level) can be obtained.

The AND gates 128 and 134 select either an original oscillation signal or an output *5, and then output the one selected. Thus, in the case of "MODE=0," a clock expanded to one and a half times (it is expanded to two times only during a low level period) is outputted as a clock OSDCLK after detection of a start (to be precise, after a delay of one clock of the original oscillation signal). On the other hand, in the case of "MODE=1," the original oscillation signal is outputted as it is as a clock OSDCLK.

Figure 4:
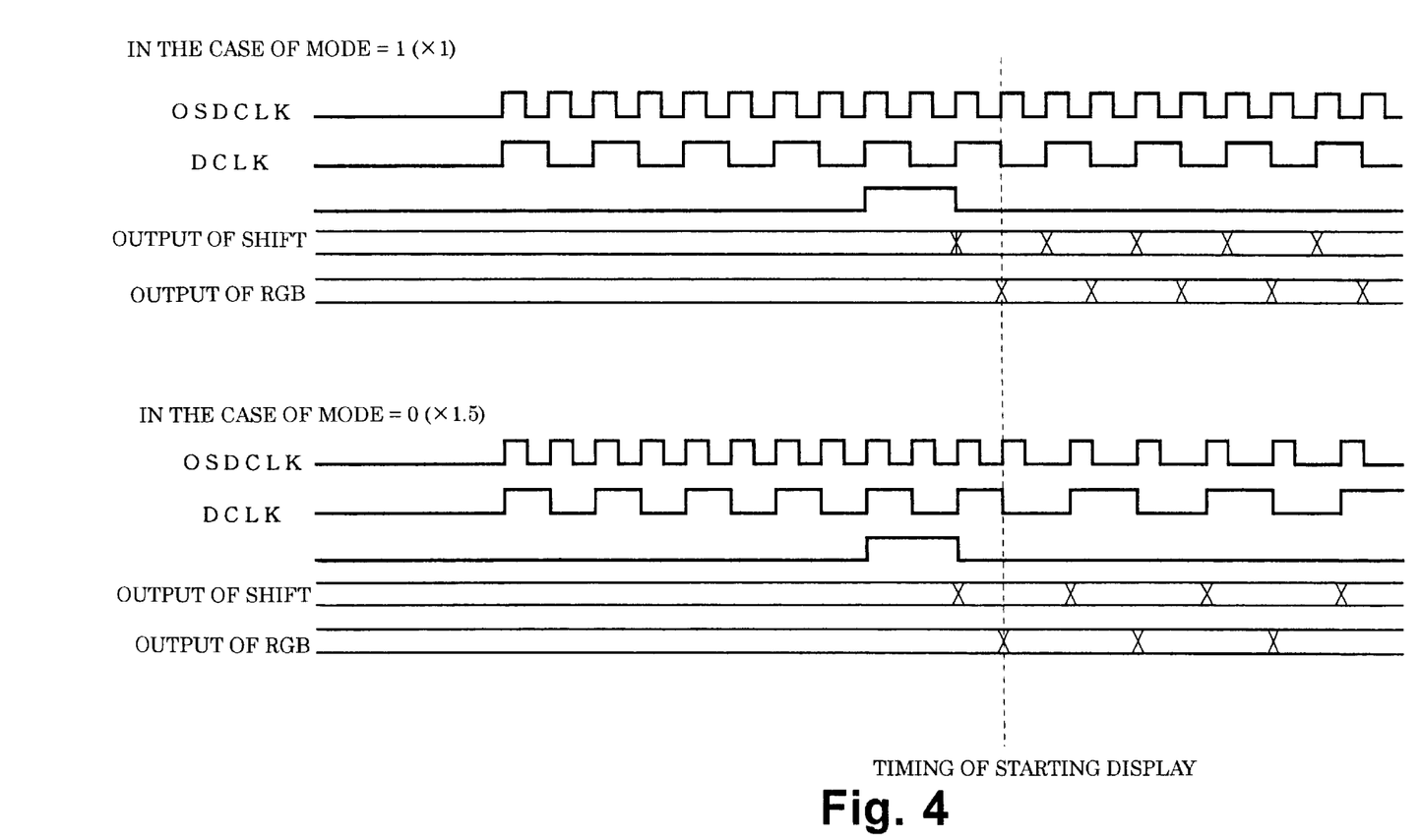
FIG. 4 is a timing chart showing output of RGB signals.

FIG. 4 is a timing chart showing the display of characters in two modes. As described above, based on a clock DCLK which is a generated clock OSDCLK divided, data of each dot are outputted from the OSD shift register 46. Thus, depending on the mode, the outputting period of the data differs, and the outputting time of RGB signals from the OSD output processing circuit 50 is determined accordingly. Thus, depending on the mode, a size of the character to be displayed is changed. On the other hand, it is understood that the start position of the character to be displayed does not change.

As described above, prior to the display of characters, the original oscillation signal ORGCLK is outputted as it is as a clock OSDCLK for displaying characters, and from the beginning of character display, a frequency of the clock OSDCLK is changed. Thus, even though the magnification of characters to be displayed is changed, the display start position does not vary.

Output of Cursor Font

Here, in this embodiment, a cursor font is stored in the second storage region (storage region of character patterns) of EEPROM 20. The EEPROM 20 has a function to read out and display the cursor font.

First, the VRAM 10 is composed of row addresses of "00 to 10"H in a longitudinal direction and 32 column addresses of "00 to 1F"H in a transverse direction. In the regions which are designated by the row addresses "00 to 0F" and column addresses "00 to 08," character display start positions (vertical positions) on a television screen, attributes or the like of characters to be first displayed on a television screen, and initialization data of display mode of the characters are written. According to the results of decoding of program data, a cursor display start vertical position and a cursor display start horizontal position are designated and supplied to a cursor vertical control circuit 60 and a cursor horizontal control circuit 70 at appropriate timing, respectively.

The cursor vertical control circuit 60 basically has a constitution similar to that of the OSD vertical control circuit 22, thereby having a register and a counter. The cursor vertical control circuit 60 stores cursor display start vertical positions supplied and determines whether it reaches the cursor display start vertical position based on a vertical synchronizing signal and a horizontal synchronizing signal which are contained in a television signal. When it reaches the cursor display start vertical position, the counter is actuated so as to count up at each horizontal scanning and a signal representing the cursor vertical position is outputted. The cursor vertical position corresponds to a low address of a cursor font (a cursor low order address). The cursor low order address is supplied to the address switching circuit 24.

Further, in a cursor character code register 62, addresses of cursor fonts are stored according to the results of decoding of program data. Since cursor fonts are stored in a predetermined location of the EEPROM 20, it is sufficient to set addresses of the cursor fonts to the cursor character code register 62 at the startup of the system.

In this cursor character code register 62, addresses in the EEPROM 20 of cursor fonts to be used are stored. For example, if a cursor font to be designated by the cursor register 62 has a dot pattern of n×m, the region for the dot pattern of n×m will be designated based on the data stored in the cursor character code register 62. According to the cursor low order address supplied from the cursor vertical control circuit 60, a vertical position (in which line among m lines) of the cursor font is determined.

Further, the cursor vertical control circuit 60 outputs a cursor VEN, namely, a signal which becomes high level between cursor display vertical positions (between a cursor display start vertical position and a cursor display ending vertical position). This cursor VEN is supplied to a cursor data readout control circuit 64. Horizontal synchronizing signals are also supplied to the cursor data readout control circuit 64. Thus, the cursor data readout control circuit 64 outputs cursor read signals which become high level only for a predetermined period detected from a horizontal synchronizing signal in a horizontal flyback period. The cursor read signals are supplied to a master side clock generating circuit 66 and the address switching circuit 24.

During a period of the cursor read signal being high level which is an OSD timing period, the address switching circuit 24 outputs an address which is designated by a cursor low order address outputted from the cursor character code register 62 and the cursor vertical control circuit 60. Thus, during this period, the EEPROM 20 outputs n bits of specified vertical position of cursor font.

In response to a cursor read signal being high level, the master side clock generating circuit 66 generates a master side clock and supplies it to the master side 68*m* of a shift register 68. This master side clock becomes high level for a prescribed period during a period of the cursor read signal being high level which is an OSD timing period. When the master side clock rises, n bit dot data of the cursor font supplied from the EEPROM 20 are fetched to the master side 68*m* of the shift register 68.

The cursor VEN from the cursor vertical control circuit 60 is supplied to the cursor horizontal control circuit 70. The cursor horizontal control circuit 70 makes an H start signal high level when it reaches from a cursor display start horizontal position supplied by the CPU 12 to a cursor display position in a horizontal direction. More specifically, horizontal synchronizing signals and clocks HCLK are supplied to the cursor horizontal control circuit 70, and the cursor display start horizontal position is detected by counting a prescribed number of clocks HCLK from the termination of a flyback period in the horizontal synchronizing signal and the H start signal is rendered high level.

The H start signal is supplied to a slave side clock generating circuit 72. Dot clocks DCLK are also supplied to the slave side clock generating circuit 72. Thus, a dot clock DCLK is outputted as a slave side clock from the last transition after the H start becomes high level once. The slave side clock is supplied to the shift register 68 as a shift clock. Thus, the shift register 68 successively outputs dot data equivalent to a line of preset cursor font to the master side 68m.

Slave side clock from the slave side clock generating circuit 72 are also supplied to a cursor stop detecting circuit 74. The cursor stop detecting circuit 74 is composed of a counter, thereby counting the slave side clocks. When counting the number n of breadth dots of cursor fonts, the cursor stop detecting circuit 74 supplies a signal representing the count to the cursor horizontal control circuit 70. The cursor horizontal control circuit 70 outputs a cursor HEN signal which shows a period from generation of the H start signal to completion of outputting of cursor display data by the cursor stop detecting circuit 74 (a period of showing the display of cursor).

Further, a cursor color register 76 is also provided, and color of the cursor, namely color data, are supplied to the cursor color register 76 according to the results of decoding of program data.

Outputs of the shift register 68 and the cursor color register 76 are supplied to a cursor output processing circuit 78. Data supplied from the shift register 68 may be one bit each, but it is also preferable to represent each dot by two bits. In other words, there are two regions of n×m bits for one cursor font in the EEPROM 20, whereby two bits of character data per one dot are outputted. Therefore, the shift register 68 also outputs two bits of data per one dot. Thus, not display of one bit such as a distinction of background and cursor position, but four kinds of states of display can be provided.

On the other hand, four kinds of RGB data are supplied from the cursor color register 76. The cursor output processing circuit 78 determines the RGB data for each dot based on the data outputted from the shift register 68, and then outputs the determined RGB data for each dot.

Both of the RGB data from the OSD output processing circuit 50 and the cursor output processing circuit 78 are supplied to a cursor display switching circuit 80. Further, a cursor HEN is also supplied from the cursor horizontal control circuit 70 to the display switching circuit 80. Depending on whether the cursor HEN is high level or low level, the cursor display switching circuit 80 switches from outputting of the RGB data supplied from the OSD output processing circuit 50 to outputting of the RGB data supplied from the cursor output processing circuit 78, and vice versa. In other words, the cursor display switching circuit 80 only selects the RGB data from the cursor output processing circuit 78 while the RGB data about cursor is outputted, whereby a desired cursor can be displayed.

A transparent display can also be applied to a background portion of the cursor without displaying the portion. In other words, certain control data are allocated to a dot of the background portion of cursor font. Also, when the cursor output processing circuit 78 recognizes, based on the control data, that the relevant dot is the background, even though the cursor HEN is high level, the cursor output processing circuit 78 outputs a cursor HEN 1 which is a signal for changing the cursor HEN to low level. Thus, when the cursor font is the background, the cursor display switching circuit 80 selects the signal from the OSD output circuit 50 and outputs it. Consequently, a character display is left out in the background portion of cursor font.

Next, operation of the aforementioned cursor display will be described. A signal $\overline{HS}$ which is an inversion of a horizontal synchronizing signal becomes low level during a horizontal flyback period. In the CPU 12, one machine cycle is composed of six states, the first and fourth states are assigned to read out a program of accessing the first region of the EEPROM 20, and the second, third, fifth, and sixth states are assigned for access of the second region (character). A signal P/C represents a region of the EEPROM 20 to be accessed by the address switching circuit 24.

A value counted by a program counter in the CPU 12 is basically switched at every machine cycle (at the second state) although it is subject to change depending on instructions. In this embodiment, the counted values are such that in the machine cycle immediately before a flyback period, the value is K−1, from the second state of the first machine cycle of the flyback period, the value is K, and from the second state of the next machine cycle, the value is K+1. Further, since the character display is not performed during a horizontal flyback period, the OSD character code latch circuit 38 is in a reset mode (RESET) during the horizontal flyback period.

The cursor data readout control circuit 64 makes a cursor read signal high level in the first to fourth states of the second machine cycle in the flyback period. Further, an address to be specified by a cursor position address supplied from the cursor character code register 62 and the cursor vertical control circuit 60 is set to a value v0 at the beginning of the flyback period.

The address switching circuit 24 switches an address from the CPU 12 and an output of the OSD character code latch circuit 38 according to the signal P/C. When the cursor read signal is high level, the address switching circuit 24 also selects an output of the cursor character code register 62 and outputs it instead of an output of the OSD character code latch circuit 38. Thus, the address switching circuit 24 outputs the address v0 in the second and third states of the second machine cycle during the flyback period. Consequently, during this period, the EEPROM 20 outputs n dots of data V0 of the cursor font for a prescribed breadth.

In accordance with the timing of outputting the cursor font, the master side clock generating circuit 66 outputs a master side clock which become high level at the start of the third state of the second machine cycle and become low level at the start of the fourth state in the flyback period. Due to the rise of the master side clock, the output V0 of the EEPROM 20 is fetched to the master side 68m of the shift register 68.

When the cursor horizontal control circuit 70 causes the H signal to rise at a prescribed timing and then lower it in the last transition, the slave side clock generating circuit 72 outputs a clock HCLK as a slave side clock. The shift register 68 then outputs preset cursor font data V0 of one dot each.

Thus, n dots of data equivalent to one line of the cursor font are supplied to the cursor output processing circuit 78.

As described above, according to this embodiment, it is not necessary to have a special ROM for a cursor, thereby simplifying the device. In particular, by storing the program, character font, and cursor font in the same EEPROM 20, the circuit can be simplified as a whole. Further, since the cursor font is read out during the horizontal flyback period, no detrimental influence is exerted upon readout of the characters to be displayed. Further, due to such constitution that the cursor font is directly latched on the master side of the shift register 68, the circuit can be reduced in size. Further, since the cursor font is contained in the EEPROM 20 in the same manner as that of an ordinary character font, during a production test of LSI, the character pattern can be tested applying the same test pattern to the cursor and the OSD. Thus, there is no need for an exclusive test pattern for the cursor. Further, by containing two bits data per dot in the EEPROM 20, a graphic display of the cursor is possible. Since clocks H CLK outputted from the OSD horizontal control circuit 26 are used as clocks to be supplied to the cursor horizontal control circuit 70 and the slave side clock generating circuit 72, if the counted values of these clocks are identical, the cursor can be positioned at the same location of the character to be displayed.

Other Constitution

Here, in the OSD horizontal control circuit 26, the H start counter 106 shown in FIG. 2 is provided. On the other hand, the cursor horizontal control circuit 70 also requires a counter so as to generate H start signals. Both of the counters are for counting clocks HCLK from the end of a horizontal flyback period. These counter are also used for outputting a coincidence signal once in a horizontal flyback period. Thus, it is preferable to use a single counter which serves as both these counters. More specifically, the H start counter continues counting up to the next horizontal flyback period and supplies the counted value to different comparators, whereby coincidence signals can be obtained from the respective comparators at the character display start position and the cursor display start position.

As described above, according to the present invention, even though the magnifications of characters to be displayed vary, the display start positions can be even.

What is claimed is:

1. A character display control circuit for controlling display of characters on a screen comprising:

a display start position detecting circuit for detecting a display start position of characters by counting a reference clock up to the display start position of characters; and a character pattern outputting circuit for outputting a character pattern according to an optional display clock after reaching the display start position.

2. The character display control circuit according to claim 1, wherein said display start position detecting circuit detects a period beginning at termination of a flyback period of horizontal scanning and ending at commencement of display of characters.

3. The character display control circuit according to claim 2, wherein said display start position detecting circuit has a start counter for counting a reference clock after termination of a flyback period of horizontal scanning and a comparator for comparing a counted value of the start counter with data about a character display start position, and a display start position is detected by said comparator.

4. The character display control circuit according to claim 3, wherein said display start position detecting circuit further has an H register for storing data about the character display start position, and said comparator compares a counted value of the start counter with an output of the H register.

5. The character display control circuit according to claim 3, said circuit further comprising:

a clock generating circuit which starts operation in response to an output of said comparator and outputs clocks having different cycles based on said reference clock; and a selection circuit for selecting either a clock from the clock generating circuit or said reference clock and outputting the selected clock as a display clock, wherein a size of a character to be displayed is controlled by controlling a clock to be selected by said selection circuit.

6. The character display control circuit according to claim 5, wherein said clock generating circuit has a plurality of flip flops.

7. The character display control circuit according to claim 5, wherein said selection circuit has a plurality of logic gates and selects any one of plural clocks in response to a mode detection signal supplied from outside.

8. The character display control circuit according to claim 1, said circuit further comprising:

a cursor display timing control circuit for controlling timing of displaying a cursor whose display timing is determined independent of said character display, wherein said start counter is used for detecting the timing of displaying a cursor.

* * * * *